Dec. 21, 1948.   E. C. CORK ET AL   2,456,679
HIGH-FREQUENCY IMPEDANCE BRIDGE
Filed Feb. 17, 1944
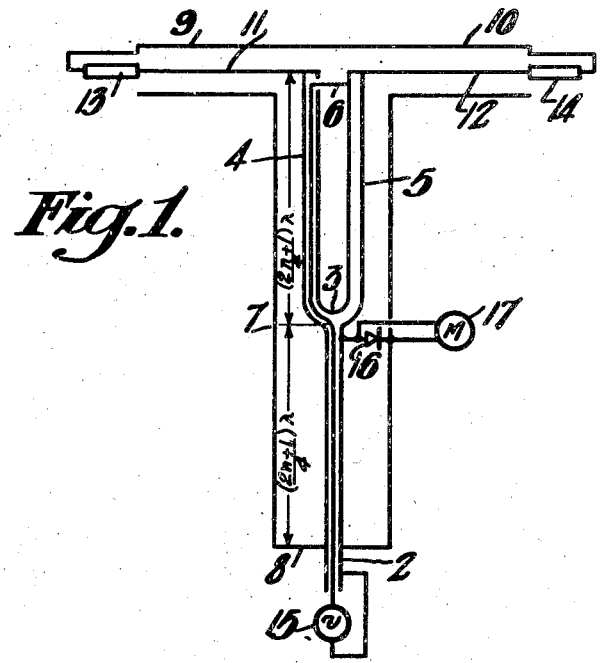
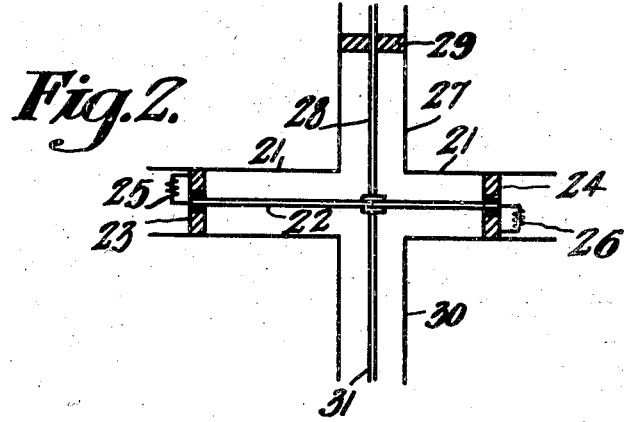
INVENTORS.
EDWARD CECIL CORK,
ALAN DOWER BLUMLEIN, DECEASED,
by DOREEN BLUMLEIN, EXECUTRIX
BY H.S.Brown
Attorney Patented Dec. 21, 1948

2,456,679

UNITED STATES PATENT OFFICE 2,456,679

HIGH-FREQUENCY IMPEDANCE BRIDGE

Edward Cecil Cork, Ealing, London, and Alan Dower Blumlein, deceased, late of Lescudjack, Penzance, England, by Doreen Blumlein, executrix, Lescudjack, Penzance, England, assignors to Electric & Musical Industries Limited, Hayes, Middlesex, England, a company of Great Britain Application February 17, 1944, Serial No. 522,830
In Great Britain May 5, 1941

Section 1, Public Law 690, August 8, 1946
Patent expires May 5, 1961

4 Claims. (Cl. 175—183)

1

The present invention relates to electric circuit arrangements for use at high frequencies and to apparatus for use in such arrangements.

It is sometimes desired to measure or compare impedances at high frequencies and conventional bridge circuit arrangements such as are normally used at lower frequencies are found to be unsuitable, more particularly due to the fact that at high frequencies radiation tends to occur and also undesired couplings take place between different portions of the circuit, thus giving rise to instability and errors in measurement.

These difficulties may be overcome by suitable sceening, but such screening is frequently found to decrease the efficiency of the arrangement.

It is therefore an object of the present invention to provide electric circuit arrangements suitable for the measurement or comparison of impedances at high frequencies in which undesirable effects due to radiation or couplings are avoided without loss of efficiency.

According to one feature of the present invention there is provided an electric circuit arrangement for use at high freqencies comprising a coaxial feeder having an internal conductor and a surrounding screen, a further conductor branching from said screen at a point intermediate its ends and extending therefrom substantially parallel to said screen to a point adjacent one end thereof so that the impedance at the operating frequency between said end of said screen and the end of said further conductor is high, a connection between said internal conductor and a point on said further conductor, a sheath substantially enclosing said feeder and said further conductor and connected to the other end of said screen, a source of high frequency oscillations and a detector of high frequency oscillations connected respectively between said internal conductor and said screen and between said sheath and said branch point or a point on said screen intermediate said branch point and said other end thereof at which the impedance is relatively high, or vice versa, the arrangement being such that if an impedance is connected between said end of said screen and said sheath and a further impedance is connected between said end of said conductor and said sheath an electrical bridge network is formed.

It is a further object of the present invention to provide a variable resistance specially adapted for use in an arrangement according to the above mentioned feature.

According to a further feature of the present invention, there is provided a variable resistance

2 for use at high freuqencies comprising a coaxial line having a central conductor and a surrounding screen substantially one quarter of a wavelength long at the operating frequency and effectively terminated at its end by resistances which are inverse about the characteristic impedance of said line, the arrangement being such that the impedance at any point on the inner conductor of said line is always a substantially pure resistance, the magnitude of which is dependent upon the position of said point.

If desired, said variable resistance may form part of a variable impedance comprising a variable reactance in the form of a coaxial line having a movable short-circuiting piston adapted to control the value of said reactance.

In order that the invention may be more clearly understood and readily carried into effect, it will now be described in greater detail by reference to the accompanying drawing of which Figure 1 is a schematic circuit diagram of one embodiment thereof; and Figure 2 is a schematic circuit diagram of a modification thereof. Similar reference numerals are applied to similar elements throughout the drawing.

Referring now to Figure 1 of the drawing, it will be seen that the arrangement comprises a coaxial feeder having an internal conductor 1 and a surrounding screen 2 which branches at point 3 into portions 4 and 5 forming a U-shaped structure, the internal conductor 1 continuing within the portion 4 and emerging therefrom at the upper end thereof to make contact with the upper end of portion 5 at the point 6. Alternatively, said internal conductor may emerge at a point intermediate the point 3 and the upper end of portion 4 and make contact with the portion 5 at a point intermediate points 3 and 6.

A cylindrical sheath 7 surrounds the coaxial feeder referred to and is closed at its lower end by a conducting annulus 8 which is joined to the screen 2 as shown. The upper end of said sheath 7 divides into the two side tubes 9 and 10 forming together with conductors 11 and 12 connected to the upper end of portions 4 and 5 of the screen 2 respectively coaxial feeders to the outer ends of which impedances 13, 14 which are to be compared or balanced are respectively connected as shown. A source of high frequency oscillations 15 is connected between the conductor 1 and the screen 2 outside the sheath 7 as shown and a high frequency detector 16, such as a diode, is effectively connected between the point 3 and an adjacent point on the sheath 7 as shown. Although the detector 16 is shown inside the sheath 7 it may, if desired, be arranged externally of the sheath 7 and connected to the point 3 and the screen 7 over a coaxial feeder. Any conventional signal indicator 17 providing suitable sensitivity may be connected to the detector 16.

The lengths of the portions 4, 5 are chosen so that at the frequency of oscillations provided by the source 15 a high impedance is presented between their upper ends. Thus, each of these portions 4, 5 may be arranged to be approximately any odd number of quarter wavelengths $$\frac{(2n+1)}{4}\lambda$$

long at the operating frequency. With this arrangement, high frequency voltages of large amplitude and opposite phase are developed in operation at the upper ends of portions 4, 5, so that the portions 4, 5 operate as high impedance bridge ratio arms.

Further, the distance between the point 3 and the points at which the annulus 8 is connected to the screen 2 is so chosen that the screen 2, annulus 8 and the sheath 7 form a concentric line short circuited at one of its ends and presenting a high impedance at point 3. The distance between the point 3 and the point at which the annulus 8 is connected to the screen 2 may be for example any odd number of quarter wavelengths.

$$\frac{(2n+1)}{4}\lambda$$

Thus, the sheath 7 and the annulus 8 do not introduce any inconveniently low impeddance in shunt with the detector 16. It will be appreciated that, if desired, the distance between the point 3 and the points at which the annulus 8 is connected to the screen 2 may be longer than a quarter of a wavelength at the operating frequency and the detector 16 may be connected to an intermediate point of suitably high impedance so that, as before, the introduction of the sheath 7 and the annulus 8 do not give rise to any undesirably low shunt impedance.

It will be appreciated that the arrangement described constitutes a high frequency bridge circuit arrangement which is suitable for the measurement of high frequency impedance. Thus, for example, if the impedance 13 is an unknown impedance, its value may be determined by adjusting the impedance 14 until the detector 16 gives a minimum indication. As the apparatus is completely screened, no undesirable radiation takes place and errors in measurement which might otherwise be caused by such radiation are avoided.

The positions of the source of high frequency oscillations 15 and the detector of high frequency oscillations 16 may if desired be reversed.

Any form of adjustable impedance which does not radiate may be used as impedance 14 in the arrangement of Figure 1 above referred to, but according to a further feature of the invention an impedance is provided which comprises a conveniently adjustable variable resistance.

Referring now to Figure 2, the impedance comprises a variable resistance element in the form of a terminated coaxial line and a variable reactance element also in the form of a terminated coaxial line.

The variable resistance consists of the coaxial line comprising the cylindrical conductor 21 having an internal conductor 22 supported centrally within it. The ends of conductor 22 are secured to conducting pistons 23, 24 which are slidable within the conductor 21, but the conductor 22 is insulated from said pistons 23, 24. The ends of said conductor 22 are connected to said pistons 23, 24 by means of resistances 25, 26 respectively which may either be small resistances of the grid leak type or may be lengths of coaxial cable of sufficiently high attenuation to avoid reflections and therefore acting as non-inductive resistances of value equal to their characteristic impedance.

The variable reactance comprises a further cylindrical conductor 27 branching out of the wall of conductor 21 and has a central conductor 28 supported within it. A conducting piston 29 is arranged to slide on said conductor 28 within said conductor 29 so as to form a connection of low impedance between said conductors 27 and 28. The conductor 28 is slidably connected to the conductor 22.

A cylindrical conductor 30 and central conductor 31 are also preferably provided for effecting connection to the common point of conductors 22 and 28. Thus, the conductor 30 preferably branches out of the wall of conductor 21 at a point opposite to the point at which the conductor 27 branches therefrom so that conductors 27 and 30 are coaxial and conductor 21 is an extension of conductor 28. The variable impedance can then be conveniently connected to the arrangement shown in Figure 1 by connecting conductors 30 and 31 to the conductors 10 and 12 of Figure 1 respectively.

It can be shown that if the length of conductor 22 is such that it forms with conductor 21 a coaxial line which is substantially a half wavelength long at the operating frequency and if the terminating resistances 25 and 26 are equal and have the value R different from the characteristic impedance Z of conductors 21 and 22 considered as a coaxial line, then the impedance at any point in the conductor 2 is always resistive and has a value equal to $$\frac{R}{2}\cos^2\theta + \frac{Z^2}{2R}\sin^2\theta$$

where $\theta$ is the electrical length between one of the pistons 23, 24 and the point at which the conductor 28 is joined to the conductor 22. Thus, by sliding the conductor 22 and the pistons 23, 24 fixed thereto inside the conductor 21, the resistive impedance at the point of connection between conductors 22 and 28 will vary from $$\frac{R}{2}\text{ to }\frac{Z^2}{2R}$$

according to the positions of the pistons 23, 24. It will therefore be appreciated that in order to obtain a wide variation of resistance R should differ considerably from Z.

Also, by sliding the piston 29 within the tube 27, the reactive impedance at said point of connection can be varied. Thus, the reactance and the resistance between the conductors 30 and 31 can be varied independently at will.

If desired, the pistons 23, 24 may be fixed within the conductor 21 and the conductors 27, 30, together with the conductors 28, 31 may be arranged to slide along the conductors 21 and 22 so that the common point of the conductors 28 and 31 successively makes contact with different points on the conductor 22 and thereby causes the resistive component of the impedance across conductors 30, 31 to be varied. It will also be appreciated that the conductors 27 and 30 need not be coaxial and need not be arranged to be normal to the conductor 21 as shown. For example, the conductor 27 may be cranked so as to have its axis parallel to the axis of conductor 22 is desired.

Further, although the conductor 22 has been stated to be preferably a half wavelength long it may if desired be only a quarter of a wavelength long providing that the terminating resistances are arranged to be inverse about the characteristic impedance of the conductors 21 and 22 considered as a coaxial line. Thus, if the terminating resistance at one end of the conductor 22 has a value R, the terminating resistance at the other end must have a value $$\frac{Z^2}{R}$$

It will therefore be appreciated that the variable resistance is fundamentally constituted by a coaxial line a quarter of a wavelength long and terminated by means of resistances R and $$\frac{Z^2}{R}$$

which resistances may if desired be constituted by further lengths of coaxial line suitably terminated. The half wavelength case which has been described with reference to the accompanying drawing may thus be regarded as a quarter of a wavelength line terminated at one end by a resistance R and terminated at its other end by a resistance $$\frac{Z^2}{R}$$

in the form of a further quarter wavelength of line in turn terminated by a resistance R.

It will be understood that if the terminating resistances such as 25 and 26 have some small reactance component, this reactance component can be taken up by suitably adjusting the length of conductor 22 so that the terminations effectively become pure resistances.

The above described variable impedance may be used as the adjustable impedance 14 in the arrangement previously described with reference to Figure 1. The lengths of the conductors 30 and 31 may then conveniently be chosen so that the impedance between the upper end of the portion 4 in the Figure 1 referred to and the impedance 13 is equal to the impedance between the upper end of the portion 5 in said Figure 1 and the common point of conductors 22 and 23 in the accompanying drawing, so that when the bridge is balanced the impedance 13 will be equal to the impedance to which said variable impedance is adjusted.

Apart from its use as a high frequency bridge for the measurement of impedance at high frequencies, the invention may also have other applications. For example, an aerial may be adjusted to match a feeder of some predetermined impedance by coupling one end of the feeder to the aerial and the other end of the feeder to the conductor 11 and screen 9 in Figure 1 previously referred to in place of the impedance 13. The impedance 14 required to balance the bridge may then be noted and the aerial adjustment modified until the bridge balances with a purely resistive impedance 14, thus showing the absence of reflection from the aerial.

The arrangement may also be employed to neutralize coupling between high frequency circuits. For example, in the detection of aircraft, short pulses of high frequency oscillations may be radiated at intervals and the reflections of such pulses from aircraft received upon the same aerial as that used for the transmission of the pulses. As the pulses have to be radiated at high power and as the receiver has to be very sensitive, difficulty may arise due to the coupling between transmitter and receiver via the aerial system causing high voltages to be set up in the receiver during the transmission of the pulses. This difficulty can largely be overcome by utilizing the arrangement of Figure 1. Thus, the generator 15 may be the transmitter, the detector 16 the receiver, the impedance 13 the aerial and the impedance 14 an impedance equal to that of the aerial. As the arrangement forms a balanced bridge substantially no voltage from the transmitter 15 will be set up across the receiver 16. So far as high frequency oscillations received by the aerial 13 are concerned, however, the bridge is not balanced since similar oscillations are not developed in impedance 14, so that the oscillations received in the aerial 13 will be fed to the receiver 16.

We claim as our invention:

1. In combination, a high frequency bridge measuring circuit including a concentric feeder transmission line circuit comprising inner and outer coaxial conductors, means for applying high frequency signals to said feeder circuit, a pair of quarter-wave branched portions of said outer conductor, said inner conductor continuing through one of said branched portions and being terminated on said other branched portion, a pair of concentric lines respectively connected to different ones of said branched portions thus providing relative phase inversion of said signals in said feeder circuit, means for terminating one of said branched lines in an unknown impedance to be measured, a variable known impedance, means for terminating the other of said branched lines in said variable impedance, means branching from said concentric lines for shielding said feeder circuit and said branch portions, and a signal detector, and means connecting said detector to said feeder line circuit and said shielding means to derive currents indicative of the balanced condition of said bridge.

2. Apparatus of the type described in claim 1 including means connected to said detector and responsive to said derived currents for indicating said balanced condition.

3. In combination, a high frequency bridge measuring circuit including a coaxial feeder transmission line having a central conductor and a first cylindrical outer conductor concentric with said inner conductor, a second cylindrical conductor branching from said first cylindrical conductor at a point some odd multiple of a quarter wavelength at the operating frequency from one of the ends thereof and extending substantially parallel thereto to a point adjacent said end of said first cylindrical conductor, means terminating said central conductor to a predetermined point on said second cylindrical conductor, a third cylindrical conductor surrounding said first and said second cylindrical conductors, conductive annular means terminating said first and third cylindrical conductors at a point remote from said parallel disposed first and second conductors and removed an odd multiple of quarter wavelengths at said operating frequency from the branching point of said first and second conductors, means external of said third cylindrical conductor for applying high frequency energy of said operating frequency to said bridge circuit, coaxial means including a first branched portion of said third cylindrical conductor for connecting an unknown impedance to be measured between the end of said first cylindrical conductor and an adjacent point on said third cylindrical conductor, and coaxial means including a second branched portion of said third cylindrical conductor for connecting a known variable impedance between the adjacent end of said second cylindrical conductor and said third cylindrical conductor; and a signal detector connected between said branching point on said first cylindrical conductor and an adjacent point on said third cylindrical conductor in said bridge circuit for determining balanced conditions therein.

4. The combination defined in claim 3 including said known variable and unknown impedances connected to said respective coaxial connecting means.

EDWARD CECIL CORK.
DOREEN BLUMLEIN,
*Executrix of the Estate of Alan Dower Blumlein, Deceased.*

REFERENCES CITED

The following references are of record in the file of this patent:

UNITED STATES PATENTS

| Number    | Name       | Date           |
|-----------|------------|----------------|
| 1,471,383 | Clark      | Oct. 23, 1923  |
| 1,573,337 | Vennes     | Feb. 16, 1926  |
| 1,732,311 | Nyquist    | Oct. 22, 1929  |
| 2,138,906 | Cork       | Dec. 6, 1938   |
| 2,232,792 | Levin      | Feb. 25, 1941  |
| 2,249,963 | Lindenbald | July 22, 1941  |
| 2,288,030 | Salinger   | June 30, 1942  |
| 2,294,881 | Alford     | Sept. 8, 1942  |
| 2,337,934 | Scheldorf  | Dec. 28, 1943  |

FOREIGN PATENTS

| Number  | Country | Date          |
|---------|---------|---------------|
| 263,664 | Italian | Aug. 10, 1927 |